United States Patent
Dunham et al.

(10) Patent No.: US 11,314,645 B1
(45) Date of Patent: Apr. 26, 2022

(54) CACHE STASH RELAY

(71) Applicant: Arm Limited, Cambridge (GB)

(72) Inventors: Curtis Glenn Dunham, Austin, TX (US); Jonathan Curtis Beard, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/123,527

(22) Filed: Dec. 16, 2020

(51) Int. Cl.
G06F 12/0811 (2016.01)
G06F 12/0831 (2016.01)
G06F 12/0862 (2016.01)
G06F 12/084 (2016.01)

(52) U.S. Cl.
CPC ........ *G06F 12/0811* (2013.01); *G06F 12/084* (2013.01); *G06F 12/0835* (2013.01); *G06F 12/0862* (2013.01)

(58) Field of Classification Search
CPC .................................................. G06F 12/0811
USPC ........................................................ 711/154
See application file for complete search history.

(56) References Cited

U.S. PATENT DOCUMENTS

2002/0144062 A1* 10/2002 Nakamura .............. G06F 9/383 711/137
2004/0059871 A1* 3/2004 Arimilli .............. G06F 12/0811 711/122

OTHER PUBLICATIONS

Dogan, H., Ahmad, M., Kahne, B., & Khan, O. (2019). Accelerating Synchronizations Using Moving Compute to Data Model at 1,000-Core Multicore Scale, ACM Transactions on Architecture and Code Optimization (TACO), 16(1), 1-27.
I. Hur and C. Lin, "Memory Prefetching Using Adaptive Stream Detection," 2006 39th Annual IEEE/ACM International Symposium on Microarchitecture (MICRO'06), Orlando, FL, 2006, pp. 397-408.
N. P. Jouppi, "Improving Direct-Mapped Cache Performance by the Addition of a Small Fully Associative Cache and Prefetch Buffers," [1990] Proceedings. the 17th Annual International Symposium on Computer Architecture, Seattle, WA, USA, 1990, pp. 364-373.
Varoglu, S., & Jenks, S. (2011). Architectural Support for Thread Communications in Multi-Core Processors, 37(1), 26-41.
Y. Wang, R. Wang, A. Herdrich, J. Tsai and Y. Solihin, "CAF: Core to core Communication Acceleration Framework," in 2016 International Conference on Parallel Architecture and Compilation Techniques (PACT), Haifa, Israel, 2016 pp. 351-362.

* cited by examiner

*Primary Examiner* — Jae U Yu
(74) *Attorney, Agent, or Firm* — Leveque Intellectual Property Law, P.C.

(57) ABSTRACT

In a cache stash relay, first data, from a producer device, is stashed in a shared cache of a data processing system. The first data is associated with first data addresses in a shared memory of the data processing system. An address pattern of the first data addresses is identified. When a request for second data, associated with a second data address, is received from a processing unit of the data processing system, any data associated with data addresses in the identified address pattern are relayed from the shared cache to a local cache of the processing unit if the second data address is in the identified address pattern. The relaying may include pushing the data from the shared cache to the local cache or a pre-fetcher of the processing unit pulling the data from the shared cache to the local cache in response to a message.

19 Claims, 6 Drawing Sheets

CACHE STASH RELAY

BACKGROUND

In most data processing systems, processing speeds are much faster than memory access speeds. Consequently, the availability of data limits the performance of a system. High speed caches can provide significant improvement, provided that data is in the cache when needed by a processor core. Caches work well, for example, when data at a particular address is loaded into the cache when first used and then reused before being evicted from the cache. However, no improvement is provided when data is not reused before eviction.

Caches also provide benefit when data usage can be predicted and the data pre-fetched from memory. However, prediction errors, due to program branching for example, result in unnecessary memory read operations.

Caches also provide performance benefits when data from an input device can be injected directly into a cache of a target processor core. This approach is also called cache stashing. However, in a multiprocessor system, cache stashing requires that the input device knows the core identifier of the target processor. This information may not be available or it may be undesirable to provide the information to an input device.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding or analogous elements.

DETAILED DESCRIPTION

The various apparatus and devices described herein provide mechanisms for cache data injection in a data processing system.

While this present disclosure is susceptible of embodiment in many different forms, there is shown in the drawings and will herein be described in detail specific embodiments, with the understanding that the embodiments shown and described herein should be considered as providing examples of the principles of the present disclosure and are not intended to limit the present disclosure to the specific embodiments shown and described. In the description below, like reference numerals are used to describe the same, similar or corresponding parts in the several views of the drawings. For simplicity and clarity of illustration, reference numerals may be repeated among the figures to indicate corresponding or analogous elements. In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or", as used herein, is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

As used herein, the term "configured to", when applied to an element, means that the element may be designed or constructed to perform a designated function, or that the element has the required structure to enable it to be reconfigured or adapted to perform that function.

Figure 1:
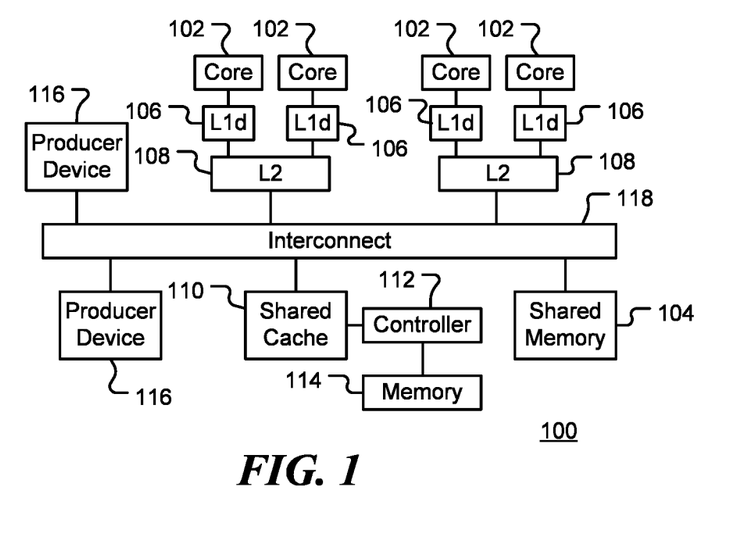
FIG. 1 is a block diagram of a data processing system, in accordance with various representative embodiments.

FIG. 1 is a block diagram of a data processing system 100, in accordance with various representative embodiments. System 100 includes a number of processing cores 102 configured to access a shared memory 104. Memory access speeds are much slower than processor speeds, so system 100 also includes one or more high speed caches. The caches may be arranged in a hierarchy, the highest level (level one or 'L1') being the fastest and closest to the processing cores. In the example shown, each processing core 102 has a local or private L1 cache 106. This may be reserved for data (L1d) with another L1 cache (not shown) reserved for instructions. Alternatively, the L1 cache could be used for both instructions and data. A larger, slower level two (L2) cache 108 may be shared by several processing cores and feeds data to the L1 caches.

In addition, system 100 includes shared cache 110. The shared cache is the lowest level of the cache hierarchy and is referred to as a last level cache (LLC) or system cache (SC). Shared cache 110 is controlled by a controller 112 that has access to a table memory 114. These will be discussed in more detail below.

Producer devices 116 provide data to be processed or consumed by the processing cores. Example producer devices include network interface cards (NICs), other processors, input devices, Direct Memory Access (DMA) controllers, etc.

Coherent interconnect circuitry 118 enables information, such as messages and data, to be passed between the various elements of the data processing system.

In a conventional data processing system, data received from a producer device 116 is stored in a designated buffer in the shared memory 104.

Figure 2:
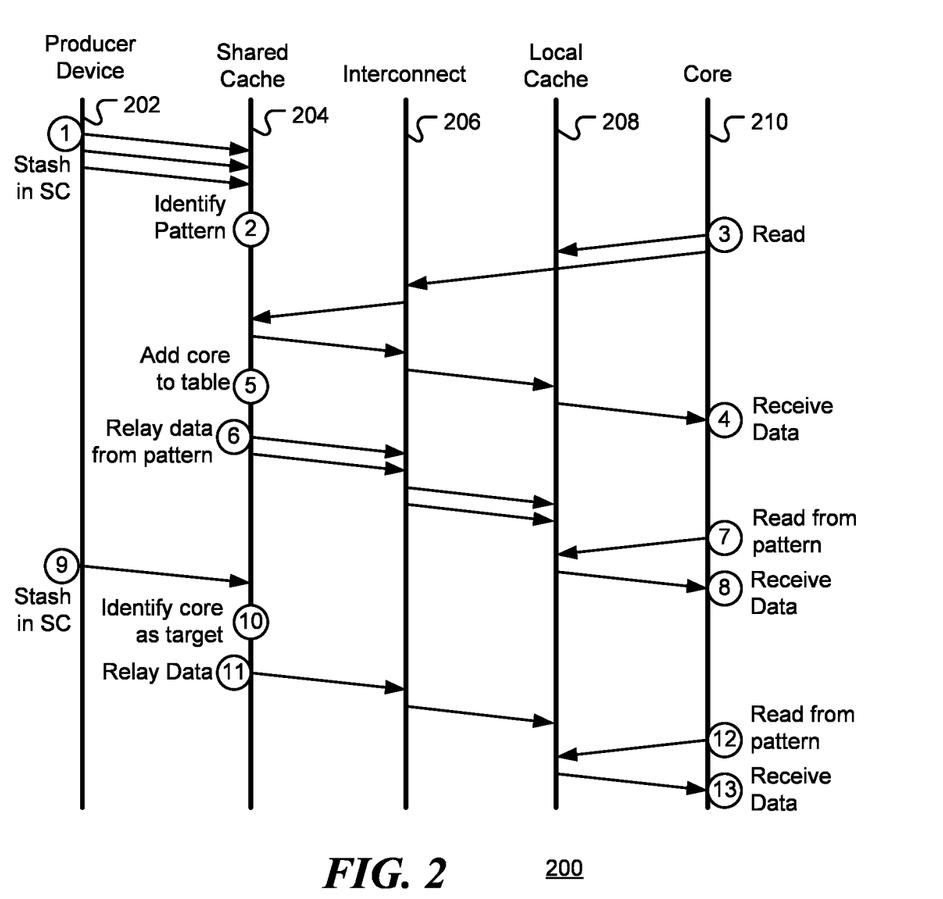
FIG. 2 is a transaction diagram showing information flow in a data processing system, in accordance with various representative embodiments.

FIG. 2 is a transaction diagram 200 showing information flow in a data processing system, in accordance with various representative embodiments. The diagram shows timeline 202 for a producer device, timeline 204 for a shared cache, timeline 206 for interconnect circuitry, timeline 208 for a local cache of a consumer processor core and timeline 210 for the consumer processor core. In each case, time flows from top to bottom in the diagram.

At time (1) the producer device starts stashing or injecting data into the shared cache. The producer device may be provided with one or more target addresses. The target address may be the address of a pre-allocated data block in the shared cache, for example. The data may also be sent to a memory. Alternatively, the data in the shared cache may be flagged as having a 'dirty' or 'modified' coherency status to indicate that it should be written to memory when evicted from the cache.

In accordance with an embodiment of the present disclosure, at time (2) the controller of the shared cache recognizes an address pattern of the stashed data. For example, a sequence of consecutive addresses may be detected. If this is a new address pattern, an entry for the pattern is created in a prediction table. The entry contains descriptors of the address pattern, such as start address and end address, or a start address and size (number of addresses or number of cache lines), for example. If the pattern is not new, the existing entry may be updated. For example, the entry could be updated with a new end address or size.

At time (3), a consumer core issues a load request for data associated with an address in the identified address pattern. First, the local cache is checked to see if a copy of the data is stored there. If not, a cache miss occurs and a read request is sent to home agent associated with the data address. The read request is sent via the interconnect circuitry, which introduced a first latency. The home agent checks for the requested data in the shared cache, introducing a second latency and, finding the data, returns the data via the interconnect circuitry, introducing a third latency. Finally, the data may pass through a local cache hierarchy (such as L2 and L1 caches) before finally reaching the consumer core at time (4). Thus, while the latency of a memory read operation has been avoided by stashing the data in the shared cache, there is still considerable latency in the read operation.

In accordance with an embodiment of the present disclosure, at time (5) the controller of the shared cache recognizes that the consumer core has accessed data associated with an identified address pattern and adds an identifier of the consumer core in the prediction table entry for that address pattern. The identifier indicates that the consumer core is a predicted target for the data associated with the pattern. Now that the consumer core has been identified as a target, data associated with other addresses in the address pattern are pushed to consumer core at time (6). Thus, the data is first stashed in the shared cache and then relayed to the local cache of the consumer core when that core is predicted as a target. On receiving these data values the consumer core may select to stash the data in a local cache or discard them.

At time (7), the consumer core issues a load request for data associated with another address in the identified address pattern. This time, the requested data is found in the local cache, having been relayed to the cache at time (6). The data is loaded at time (8). Thus, the latency of requesting the data, via the interconnect circuitry, from the shared cache has been avoided. This provides a considerable performance advantage.

At time (9), additional or new data is stashed in the shared cache by the producer device. The prediction table is checked at time (10) and reveals the data to be associated with an address in an identified address pattern. The prediction table identifies the consumer core as a potential target for the data and, at time (11), the new data is relayed to the identified consumer core.

At time (12), the consumer core issues a load request for new data. The requested data is found in the local cache, having been relayed to the cache at time (11). The data is loaded at time (13). Again, the latency of retrieving the data, via the interconnect circuitry, from the shared cache has been avoided, providing a considerable performance advantage.

Figure 3:
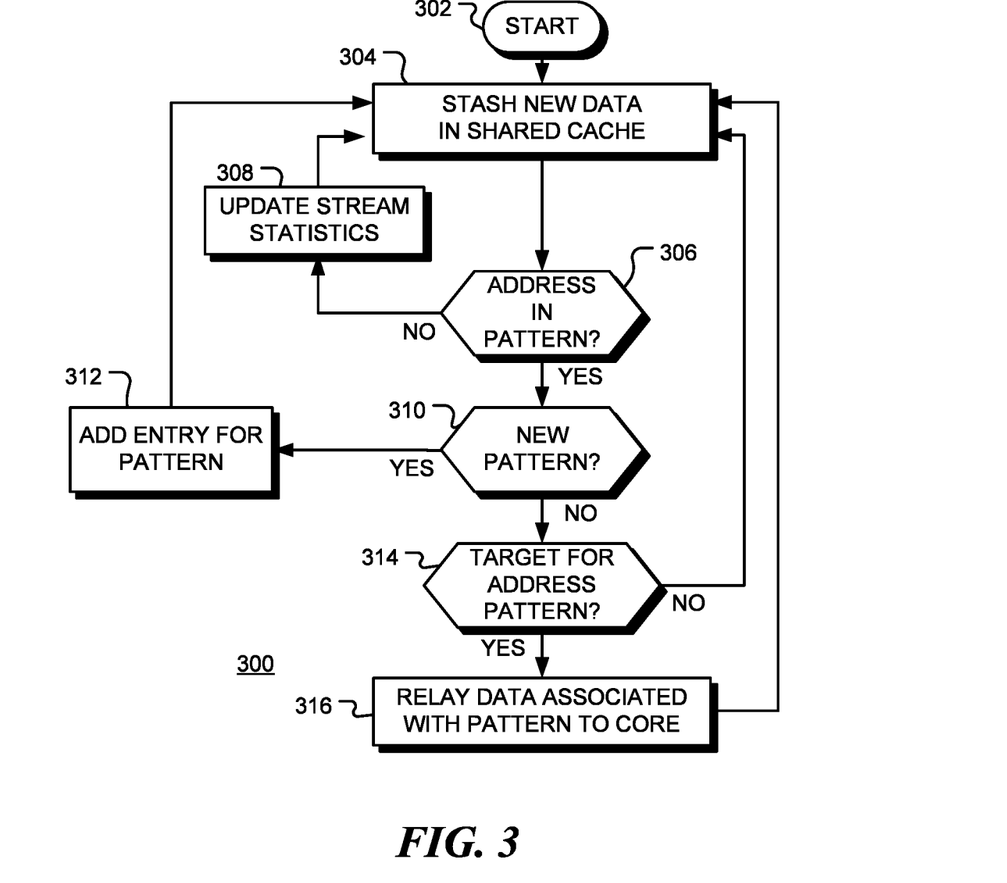
FIG. 3 is a flow chart of a method of data movement in a data processing system, in accordance with various representative embodiments.

FIG. 3 is a flow chart of a method 300 of data movement in a data processing system, in accordance with various representative embodiments. Following start block 302, new data is stashed or injected into a shared cache of the data processing system at block 304. At decision block 306 it is determined, by controller circuitry associated with the shared cache, if the address associated with the new data, together with addresses associated with previously stashed data, form a pattern of addresses. If not, as depicted by the negative branch from decision block 306, stream statistics may be updated at block 308. For example, if the previous address was part of a stream of consecutive address, but the new address is not, the length of the terminated stream may be used to update a counter of streams of that length or similar length. If the address is part of a pattern of addresses, as depicted by the positive branch from decision block 306, flow continues to decision block 310. If the address pattern is a newly identified pattern, as depicted by the positive branch from decision block 310, a new entry is added to the prediction table for the pattern. The entry includes descriptors of the pattern, such as start address, stop address, stride, etc. If the identified pattern is not new, the corresponding entry in the prediction table is accessed to determine if a target consumer core is listed in the table as a predicted target. If a target consumer core is identified, as depicted by the positive branch from decision bock 314, the data is relayed to a local cache of that target consumer core at block 316.

Figure 4:
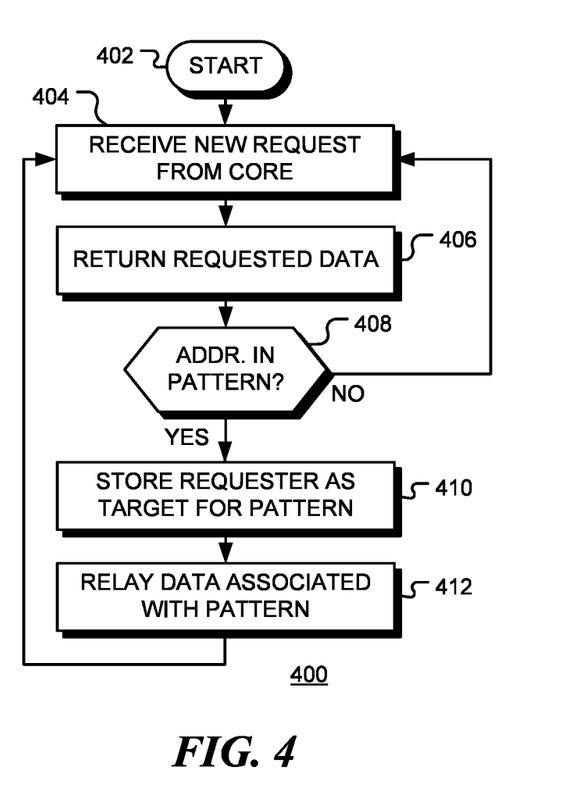
FIG. 4 is a flow chart of a method of data movement in a data processing system, in accordance with various representative embodiments.

FIG. 4 is a flow chart of a method 400 of data movement in a data processing system, in accordance with various representative embodiments. Following start block 402, a controller associated with a shared cache receives a new request, from a consumer core, for data associated with a designated data address at block 404. At block 406, the requested data is returned to the core, having been retrieved from the shared cache or, if not present in the shared cache, from the designated address in a memory. A decision block 408, a prediction table is searched to determine if the designated address is in an identified address pattern. If not, as depicted by the negative branch from decision block 408, flow returns to block 404. If the designated address is part of a previously identified address pattern, as depicted by the positive branch from decision block 408, an identifier of the consumer core is added to the entry in the prediction table for the identified address pattern at block 410, indicating the core to be a target for data associated with the address pattern. At block 412, any other data in the shared cache that is associated with addresses in the identified address pattern is relayed to a local cache of the core. In this way, data associated with the address pattern is placed in local cache of the core in anticipation that the core, having accessed one address in the pattern, with likely request access to data associated with other addresses in the pattern. When this access is requested, the data will be available in the local cache of the core, thereby avoiding the delay associated with requesting the data via the interconnect circuitry.

Figure 5:
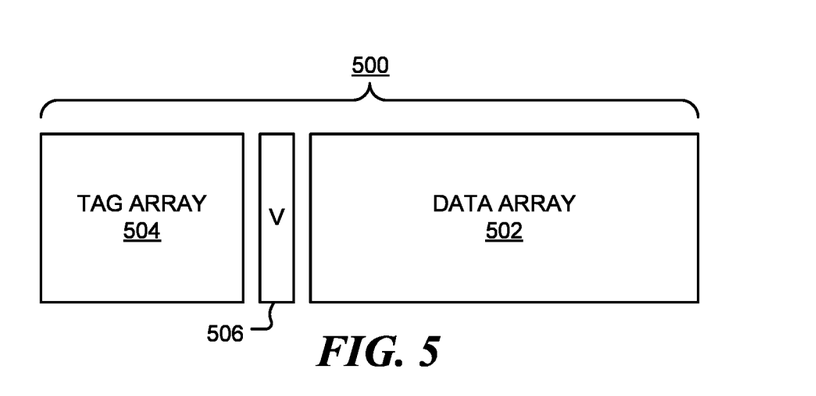
FIG. 5 is a diagram of a logical arrangement of information in a shared cache of a data processing system.

FIG. 5 is a diagram of a logical arrangement of information 500 in a shared cache of a data processing system. The information includes data array 502 for storing cached data. The data is logically organized as a number of lines, each containing data associated with multiple addresses. Corresponding address tags are stored in tag array 504. The tag array enables the controller to identify which line of data in data array 502 contains data associated with a given address. When data is stashed in the shared cache by a producer device, its address tag is added to address tag array 504 and the data is stored in a corresponding line of data array 502. The status of a line of data is stored in status array 506. This may indicate, for example, if a line of data is valid or invalid. In addition, the status may indicate whether or not the line was stashed or is associated with an identified address pattern. This would reduce the number of accesses to the prediction table.

Figure 6:
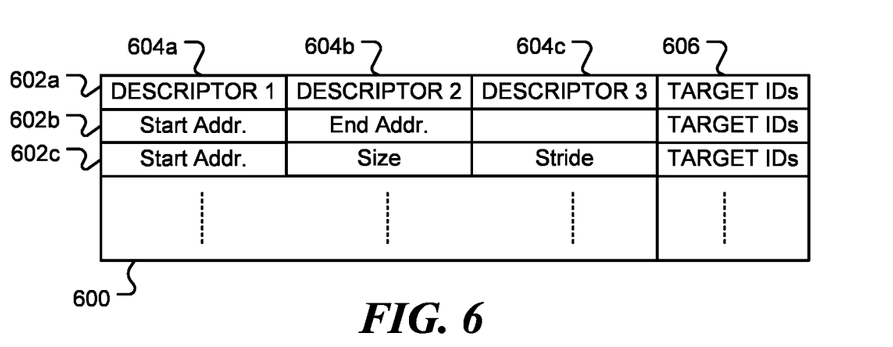
FIG. 6 is a diagram of a logical arrangement of address pattern information in a data processing system, in accordance with various representative embodiments.

FIG. 6 is a diagram of a prediction table 600, in accordance with various representative embodiments. Each logical row, 602a, 602b, 602c, etc., of the prediction table includes a number of descriptors, 604a, 604b, 604c, etc., of an associated identified address pattern. An address pattern may have any number of descriptors. For example, in row 602b, descriptor 604a is a starting address and descriptor 604b is an end address of a pattern comprising a stream of consecutive addresses. In row 602c, descriptor 604a is a starting address and descriptor 604b is a size (such as a number of addresses, a number of cache lines or a number of data blocks). Descriptor 604c is a 'stride' of a pattern, indicating the number of elements between successive elements in a data stream.

An additional entry 606 in each row identifies consumer cores that have accessed data associated with an address in the address pattern. This may be, for example, a list of explicit identifiers or a bit pattern in which each bit position corresponds to consumer core in the data processing system. Other logical arrangements or formats may be used without departing from the present disclosure.

The prediction table may be reset at intervals to remove outdated information. In addition, a consumer core may provide feedback to the controller as to the utilization of relayed data. This feedback may be used to update the prediction table. For example, a core identifier may be remove from an entry in the table if the corresponding relayed data was found to be not useful.

As described above, the controller associated with the shared cache identifies a stream of addresses associated with stashed data as an address pattern. However, since space in the local caches is limited, it may be advantageous to select which address patterns should be relayed to a target consumer core. For example, stashing data associated with longer streams may provide greater performance benefits. In accordance with an embodiment of the disclosure, statistics relating to the length of data streams are maintained. A number of stream length ranges are designated and, for each length range, a counter value is incremented each time a stream of the corresponding length is completed. Based on this information, the controller may select a threshold on the stream length. For example, the controller could select to only relay data associated with stream lengths of 10 or more.

The table may be reset periodically. Alternatively, the counter values may be decremented at designated time intervals so that they reflect more recent core behavior.

Figure 7:
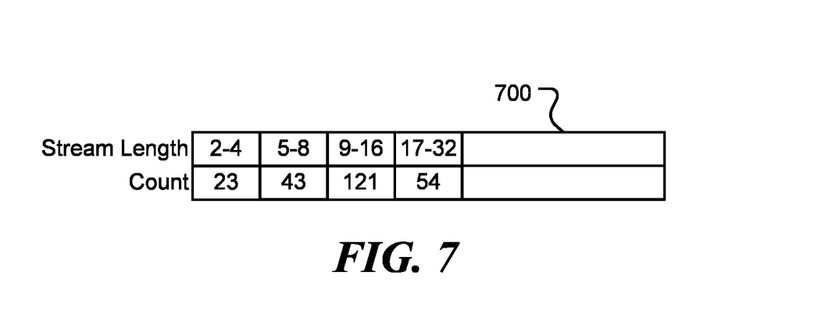
FIG. 7 is a diagram of a logical arrangement of stream information in a data processing system, in accordance with various representative embodiments.

FIG. 7 is a diagram of a logical arrangement of stream information 700 in a data processing system in accordance with embodiments of the disclosure. As described above, the controller associated with the shared cache identifies a stream of addresses associated with stashed data as an address pattern. However, since space in the local caches is limited, it may be advantageous to select which address patterns should be relayed to a target consumer core. For example, stashing data associated with longer streams may provide greater performance benefits. In accordance with an embodiment of the disclosure, statistics relating to the length of data streams are maintained. In the example shown, a number of stream length ranges are designated. For each length range, a counter value is incremented each time a stream of the corresponding length is completed. In the example shown, streams with length 2-4 (cache lines or address) have been detected 23 times, streams with length 5-8 have been detected 43 times, streams with length 9-16 have been detected 121 times, etc. Based on this information, the controller may select a threshold on the stream length. For example, the controller could select to only relay data associated with stream lengths of 9 or more.

The table may be reset periodically. Alternatively, the counter values may be decremented at designated time intervals so that they reflect more recent core behavior.

Figure 8:
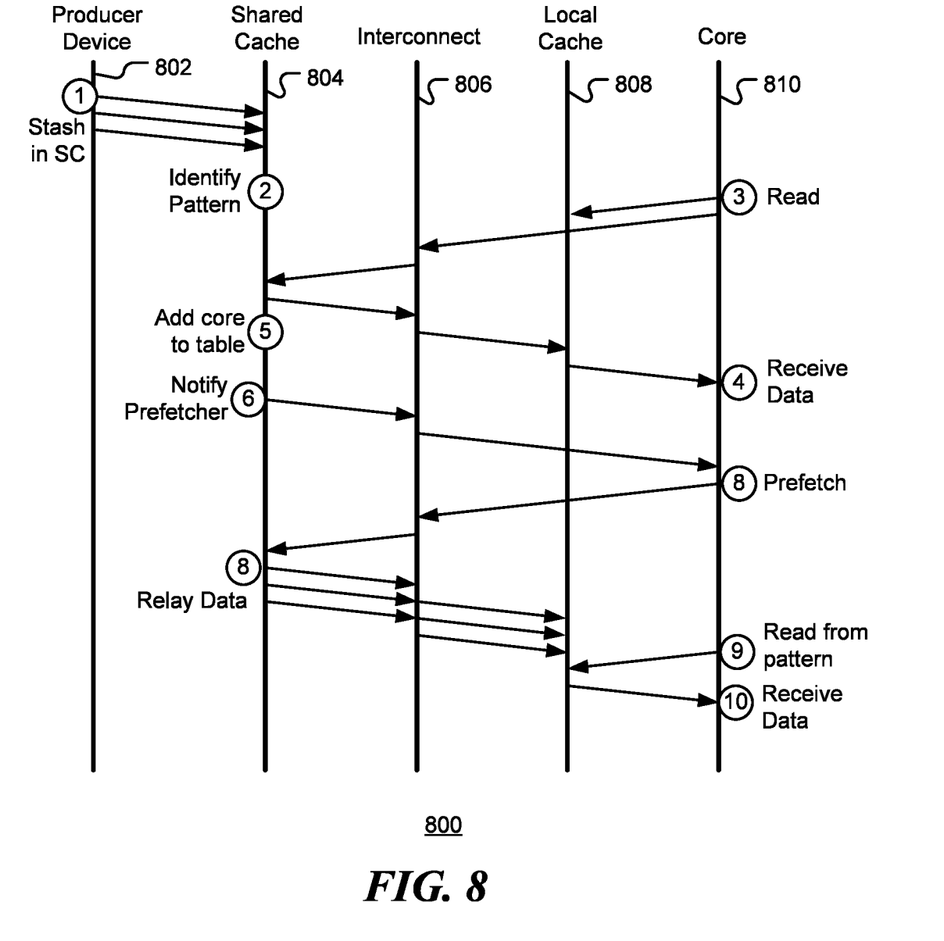
FIG. 8 is a transaction diagram showing information flow in a data processing system, in accordance with various representative embodiments.

FIG. 8 is a transaction diagram 800 showing information flow in a data processing system, in accordance with various representative embodiments. The diagram shows timeline 802 for a producer device, timeline 804 for a shared cache, timeline 806 for interconnect circuitry, timeline 808 for a local cache of a consumer processor core and timeline 810 for the consumer processor core. In each case, time flows from top to bottom in the diagram.

As in the embodiment shown in FIG. 2 and described above, at time (1) the producer device begins stashing data into the shared cache. The producer device may be provided with one or more target addresses. The target address may be a pre-allocated data block in the shared cache, for example. At time (2) the controller of the shared cache recognizes an address pattern of the stashed data. For example, a sequence of consecutive addresses may be detected. If this is a new address pattern, an entry for the pattern is created in a prediction table. At time (3), a consumer core issues a load request, via the interconnect circuitry, for data associated with an address in the identified address pattern consumer core. At time (4) the data is received at the core. At time (5) the controller of the shared cache recognizes that the consumer core has accessed data associated with an identified address pattern and stores an identifier of that consumer core in the prediction table entry for the address pattern. This indicates that the consumer core is a predicted target for data associated with the pattern.

In accordance with an embodiment of the disclosure, at time (6) the controller sends a message, via the interconnect circuitry, to a pre-fetcher of the requesting consumer core, indicating that data associated with the address pattern is available in the shared cache. At time (7), the pre-fetcher of the in the consumer core issues a request to pre-fetch data associated with the address pattern. At time (8), the requested data is relayed from the shared cache to a local cache of the consumer core. When the consumer core executes a load instruction for the data, at time (9), the data is available in the local cache and can be loaded, with minimum latency, at time (10).

Numerous details have been set forth to provide an understanding of the embodiments described herein. The embodiments may be practiced without these details. In other instances, well-known methods, procedures, and components have not been described in detail to avoid obscuring the embodiments described. The disclosure is not to be considered as limited to the scope of the embodiments described herein.

Those skilled in the art will recognize that the present disclosure has been described by means of examples. The present disclosure could be implemented using hardware component equivalents such as special purpose hardware and/or dedicated processors which are equivalents to the present disclosure as described and claimed. Similarly, dedicated processors and/or dedicated hard wired logic may be used to construct alternative equivalent embodiments of the present disclosure.

Dedicated or reconfigurable hardware components used to implement the disclosed mechanisms may be described, for example, by instructions of a hardware description language (HDL), such as VHDL, Verilog or RTL (Register Transfer Language), or by a netlist of components and connectivity. The instructions may be at a functional level or a logical level or a combination thereof. The instructions or netlist may be input to an automated design or fabrication process (sometimes referred to as high-level synthesis) that interprets the instructions and creates digital hardware that implements the described functionality or logic.

The HDL instructions or the netlist may be stored on non-transient computer readable medium such as Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present disclosure. Such alternative storage devices should be considered equivalents.

Various embodiments described herein are implemented using dedicated hardware, configurable hardware or programmed processors executing programming instructions that are broadly described in flow chart form that can be stored on any suitable electronic storage medium or transmitted over any suitable electronic communication medium. A combination of these elements may be used. Those skilled in the art will appreciate that the processes and mechanisms described above can be implemented in any number of variations without departing from the present disclosure. For example, the order of certain operations carried out can often be varied, additional operations can be added or operations can be deleted without departing from the present disclosure. Such variations are contemplated and considered equivalent.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

In one embodiment, a method for cache stashing is provided. First data, from a producer device of a data processing system, is stashed in a shared cache of the data processing system. The first data is associated with a plurality of first data addresses in a shared memory of the data processing system and an address pattern of the plurality of first data addresses is identified. In response to receiving a request, from a processing unit of the data processing system, for second data associated with a second data address, the second data address is determined to be in the identified address pattern and data associated with data addresses in the identified address pattern is relayed from the shared cache to a local cache of the processing unit.

The identified address pattern may include a range of consecutive data addresses.

In a further embodiment, relaying the data associated with data addresses in the identified address pattern includes pushing the data from the shared cache to the local cache of the processing unit.

In a further embodiment, relaying the data associated with data addresses in the identified address pattern includes sending a message to inform a pre-fetcher of the processing unit of the identified address pattern and the pre-fetcher of the processing unit pulling the data from the shared cache to the local cache of the processing unit.

In further embodiment, third data from the producer device is stashed in the shared cache, the third data associated with a third data address in the shared memory. When the third data address is determined to be in the identified address pattern, the processing unit is predicted to be a target for data in the identified address pattern and the third data is relayed from the shared cache and stashed in the local cache of the processing unit.

In a further embodiment, descriptors of the identified address pattern are stored in an entry of a prediction table and an identifier of the processing unit is stored in the entry of the prediction table as a target for the data associated with the identified address pattern.

In a further embodiment, third data is relayed from the producer device and stashed in the shared cache of the data processing system, the third data associated with a third data address in the shared memory. When, from the prediction table, the third data address is determined to be in the identified address pattern, it is determined, from the prediction table, that the processing unit is the target for data in the identified address pattern and the third data is relayed from the shared cache and stashed in the local cache of the processing unit.

The shared cache may be a system level cache or a last level cache of the data processing system and the local cache of the processing unit may be a level one (L1) cache or a level two (L2) cache of the processing unit.

In a further embodiment, a data processing system is provided. The data processing system including a first processing unit, one or more second processing units, a shared cache, a producer device and a controller. The first processing unit has a local cache and the shared cache is accessible by the first processing unit. The stashed data is associated with a plurality of first data addresses in a shared memory of the data processing system. The producer device is configured to stash data in the shared cache. The controller is configured to identify an address pattern of the plurality of the first data addresses. Responsive to receiving a request, from the first processing unit, for second data associated with a second data address, the controller determines the second data address to be in the identified address pattern and data associated with data addresses in the identified address pattern is relayed from the shared cache to a local cache of the first processing unit.

In a further embodiment, the controller is configured to push the data associated with data addresses in the identified address pattern from the shared cache to the local cache of the first processing unit.

In a still further embodiment, the controller is configured to send a message to a pre-fetcher of the first processing unit when data stashed in the shared cache is determined to be an identified address pattern. The pre-fetcher of the first processing unit then pulls the data associated with data addresses in the identified address pattern from the shared cache to the local cache of the first processing unit in response to the message.

The shared cache may be a system cache or a last level cache and the local cache of the first processing unit may be a level one (L1) cache or a level two (L2) cache, for example.

The identified address pattern may be a range of consecutive data addresses, for example.

In a further embodiment, the data processing system includes a memory and the controller is configured to store descriptors of the identified address pattern in an entry of a prediction table stored in the memory.

The controller may be configured to store an identifier of the first processing unit in the entry of the prediction table as a target for the data associated with the identified address pattern. In addition, the controller may be further configured to determine, from the prediction table, that a third data address, associated with third data stashed in the shared cache by the producer device, is in the identified address pattern and determine, from the prediction table, the first processing unit to be target for data associated with the identified address pattern. In this case, the third data is relayed from the shared cache to the local cache of the first processing unit.

The producer device may be, for example, a network interface card, an input device, a camera, a hardware accelerator or a direct memory access (DMA) device.

The producer device may be a processing unit of the one or more second processing units or some other device.

In a still further embodiment, the data processing system includes interconnect circuitry, where the first processing unit and the shared cache are operationally coupled via the interconnect circuitry.

What is claimed:

1. A method comprising:
    stashing first data, from a producer device of a data processing system, in a shared cache of the data processing system, the first data associated with a plurality of first data addresses in a shared memory of the data processing system;
    identifying an address pattern of the plurality of first data addresses;
    storing descriptors of the identified address pattern in an entry of a prediction table;
    responsive to receiving a request, from a processing unit of the data processing system, for second data associated with a second data address:
        determining the second data address to be in the identified address pattern; and
        relaying data associated with data addresses in the identified address pattern from the shared cache to a local cache of the processing unit.

2. The method of claim 1, where the identified address pattern comprises a range of consecutive data addresses.

3. The method of claim 1, where relaying the data associated with data addresses in the identified address pattern includes pushing the data from the shared cache to the local cache of the processing unit.

4. The method of claim 1, where relaying the data associated with data addresses in the identified address pattern includes a pre-fetcher of the processing unit pulling the data from the shared cache to the local cache of the processing unit.

5. The method of claim 4, further comprising sending a message to inform the pre-fetcher of the processing unit of the identified address pattern.

6. The method of claim 1, further comprising:
    responsive to stashing third data from the producer device in the shared cache, the third data associated with a third data address in the shared memory:
    determining the third data address to be in the identified address pattern;
    predicting the processing unit to be a target for data in the identified address pattern; and
    stashing the third data from the shared cache in the local cache of the processing unit.

7. The method of claim 1, further comprising:
    storing an identifier of the processing unit in the entry of the prediction table as a target for the data associated with the identified address pattern.

8. The method of claim 7, further comprising:
    responsive to stashing third data from the producer device in the shared cache of the data processing system, the third data associated with a third data address in the shared memory:
    determining, from the prediction table, the third data address to be in the identified address pattern;
    determining, from the prediction table, the processing unit to be target for data in the identified address pattern; and
    stashing the third data from the shared cache in the local cache of the processing unit.

9. The method of claim 1, where the shared cache comprises a system level cache or a last level cache of the data processing system and the local cache of the processing unit comprises a level one (L1) cache or a level two (L2) cache of the processing unit.

10. A data processing system comprising:
    a first processing unit having a local cache;
    a shared cache accessible by the first processing unit and one or more second processing units of the data processing system;
    a producer device configured to stash data in the shared cache, the stashed data associated with a plurality of first data addresses in a shared memory of the data processing system; and
    a controller configured to:
        identify an address pattern of the plurality of the first data addresses;
        store descriptors of the identified address pattern in an entry of a prediction table;
        responsive to receiving a request, from the first processing unit, for second data associated with a second data address:
            determine the second data address to be in the identified address pattern; and
            relay data associated with data addresses in the identified address pattern from the shared cache to a local cache of the first processing unit.

11. The data processing system of claim 10, where the controller is further configured to push the data associated with data addresses in the identified address pattern from the shared cache to the local cache of the first processing unit.

12. The data processing system of claim 10, where the controller is further configured to send a message to a pre-fetcher of the first processing unit when data stashed in the shared cache is determined to be an identified address pattern, and the pre-fetcher of the first processing unit is configured to pull the data associated with data addresses in the identified address pattern from the shared cache to the local cache of the first processing unit.

13. The data processing system of claim 10, where the shared cache comprises a system cache or a last level cache and the local cache of the first processing unit comprises a level one (L1) cache or a level two (L2) cache.

14. The data processing system of claim 10, where the identified address pattern comprises a range of consecutive data addresses.

15. The data processing system of claim 10, where the controller is further configured to store an identifier of the first processing unit in the entry of the prediction table as a target for the data associated with the identified address pattern.

16. The data processing system of claim 15, where the controller is further configured to:
  determine, from the prediction table, that a third data address, associated with third data stashed in the shared cache by the producer device, is in the identified address pattern;
  determine, from the prediction table, the first processing unit to be target for data associated with the identified address pattern; and
  relay the third data from the shared cache to the local cache of the first processing unit.

17. The data processing system of claim 10, where the producer device comprises a network interface card, an input device, a camera, a hardware accelerator or a direct memory access (DMA) device.

18. The data processing system of claim 10, where the producer device comprises a processing unit of the one or more second processing units.

19. The data processing system of claim 10, further comprising interconnect circuitry, where the first processing unit and the shared cache are operationally coupled via the interconnect circuitry.

* * * * *